Patented Apr. 3, 1934

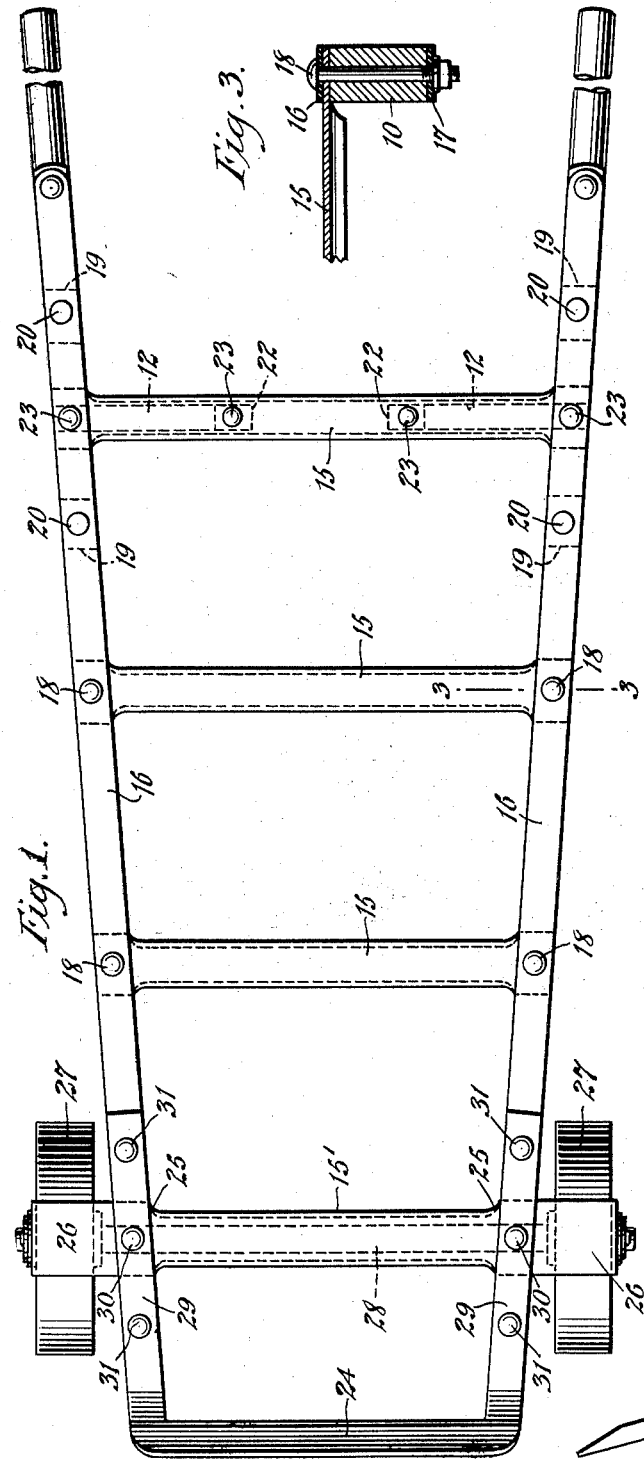

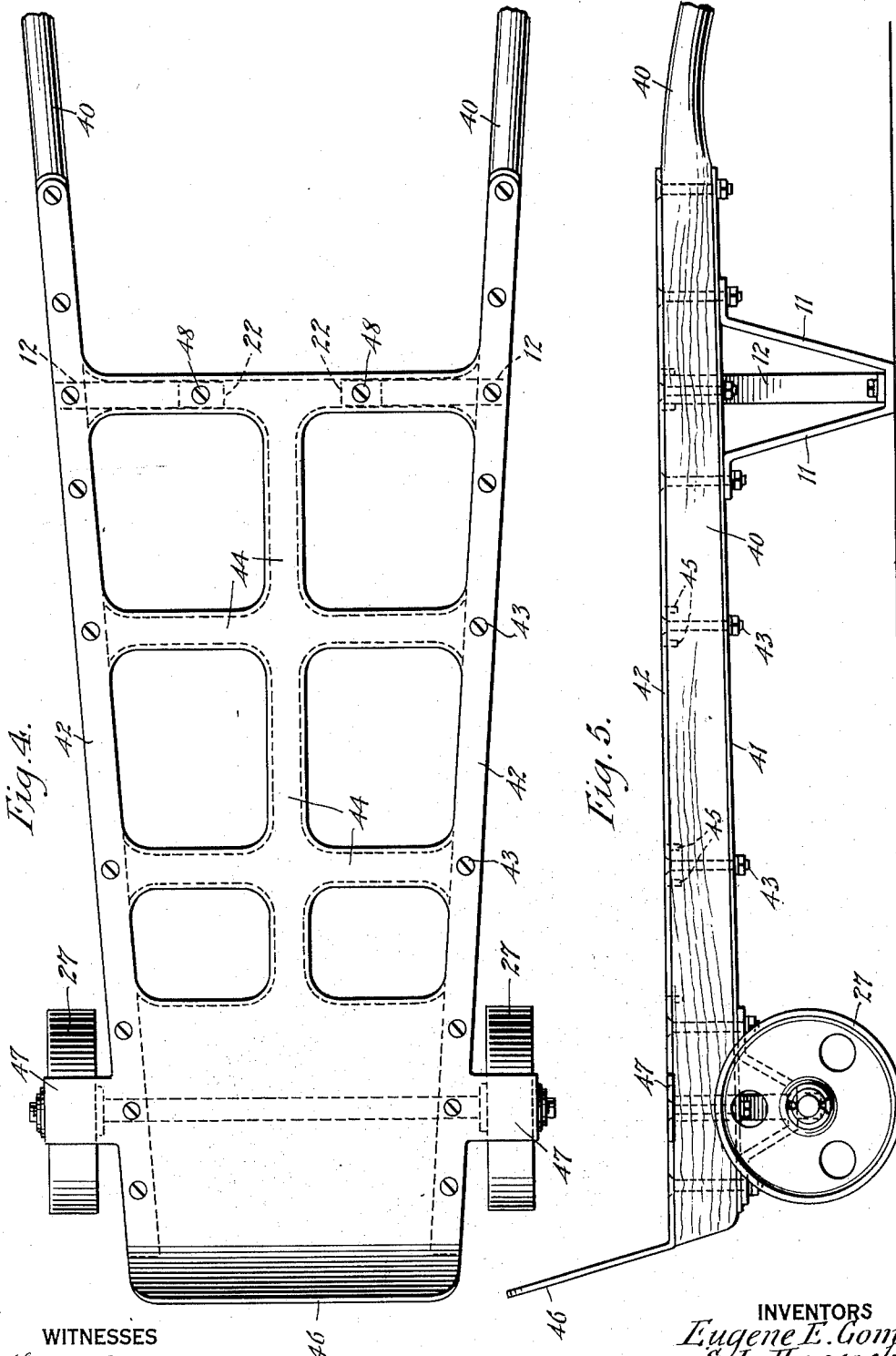

1,953,880

UNITED STATES PATENT OFFICE 1,953,880

HAND TRUCK

Eugene E. Gomes, Brooklyn, N. Y., and Samuel L. Hancock, Rome, Ga., assignors to The Fairbanks Company, New York, N. Y., a corporation of New Jersey Application February 11, 1932, Serial No. 592,398

1 Claim. (Cl. 280—53)

An object of the invention is to provide a hand truck having the elasticity of a wooden hand truck and, at the same time, the strength and durability of a metal hand truck.

Another object of the invention is to provide a hand truck having wooden handle bars, to the top and bottom of which are secured metal strips which, while preserving the elasticity of the wooden handle bars, strengthens the wooden handle bars and increase their serviceability.

The invention has as a further object to provide metal cross pieces connecting the wooden handle bars, with the ends of the metal cross pieces disposed in recesses in the wooden handle bars, and which are held in place by the metal strips which engage the outer surfaces of the metal cross pieces. Bolts are provided which extend through registering apertures in the metal strips, the ends of the metal cross pieces and the wooden handle bars for securing the parts together. These metal cross pieces, while they do not impair the flexibility of the wooden handle bars, serve to hold the handle bars in place relatively to each other by the contact of the ends of the metal cross pieces with the wooden handle bars at the recesses therein. The bolts, which extend through the apertures as stated, assist in holding the parts together.

Still another object of the invention is to extend one of the metal cross pieces beyond the wooden handle bars, with the ends of the said metal cross pieces serving as wheel guards. The nose of the truck has arms which are disposed on the metal strip at the top of the handle bars and the bolts, which hold in place the metal cross pieces with the wheel guards, also serves to hold the arms of the nose at the metal strips.

A further object of the invention is to provide a hand truck having wooden handle bars to the bottom of which are secured longitudinally extending metal strips and to the top of which is secured a metal plate extending from one wooden handle bar to the other and which extends longitudinally of the wooden handle bars, the metal plate being preferably provided with cut away portions between the wooden handle bars and the metal plate having a nose at its lower end and having lateral extensions disposed as guards over wheels with which the hand truck is provided.

Additional objects of the invention will appear in the following specification in which the preferred form of the invention is described.

In the drawings similar reference characters refer to similar parts in all the views, of which Figure 1 is a plan view of the hand truck which is the subject matter of this application;

Figure 2 is a side elevation of Figure 1;

Figure 3 is an enlarged fragmentary sectional view on the line 3—3 of Figure 1;

Figure 4 is a plan view showing a modified form of the invention; and

Figure 5 is a side elevation of Figure 4.

By referring to the drawings it will be seen that the hand truck is provided with wooden handle bars 10, legs 11, leg braces 12 and an axle support 13. The handle bars 10 have recesses 14 which are preferably in their upper faces in which are disposed the ends of the metal cross pieces 15, metal strips 16 being disposed at the top of the wooden handle bars 10 and metal strips 17 being disposed at the bottom of the said wooden handle bars 10. There are apertures in the metal strips 16 and 17, the said apertures registering with each other and also registering with apertures in the ends of the metal cross pieces 15 and apertures in the wooden handle bars 10, bolts 18 being provided which are disposed in these apertures to hold the metal cross pieces 15 and the metal strips 16 and 17 relatively to the wooden handle bars 10. It will be understood that, with the construction described, the metal cross pieces 15, which have their ends disposed in the recesses 14 in the wooden handle bars 10, will be held in these recesses by the metal strips 16 and that, with this arrangement and the bolts 18, the wooden handle bars 10 will be held in position relatively to each other under all conditions. It will also be understood that the metal strips 16 and 17 will not only serve to protect the upper and lower surfaces of the wooden handle bars 10, but that these metal strips 16 and 17 will reinforce the wooden handle bars 10 while preserving the resiliency of the same. This is particularly true with reference to the metal strips 17 at the underside of the wooden handle bars 10, for these metal strips 17, which are secured to the wooden handle bars 10 at points spaced apart, will prevent the buckling of the wooden handle bars 10 under severe strains.

As will be seen by referring to the drawings, there are several metal cross pieces 15, it being understood that any desired number of these metal cross pieces may be provided, which will be secured to the wooden handle bars 10 in the manner described. The legs 11 each has diverging portions with flanges 19, the flanges 19 having apertures which register with apertures in the metal strips 16 and 17 and the wooden handle bars 10 so that bolts 20 may be disposed in these apertures to hold the legs 11 relatively to the wooden handle bars 10, the legs 11 being provided with braces 12 which are secured to the legs 11 at 21 by any desired means, these braces 12 having flanges 22 which are secured to one of the metal cross pieces 15 by bolts 23 which extend through apertures in the said metal cross pieces 15 and in apertures in the flanges 22. It will be seen that the metal cross piece 15', which is disposed in close proximity to the nose 24 of the hand truck, has widened ends 25 which are disposed in recesses at the top of the wooden handle bars 10, the extreme ends 26 of the said metal cross piece 15' being disposed beyond the outer sides of the wooden handle bars 10 to serve as guards for the truck wheels 27, the said wheels 27 being mounted on an axle 28 which is mounted on the axle support 13.

The nose 24 has arms 29 which are disposed at the top of the metal strips 16 and over the wheels 27, the said arms 29 being secured to the metal strips 16 and 17 and the wooden handle bars 10 by means of bolts 30 which are disposed in apertures in the arms 29, as well as in apertures in the metal strips 16 and 17 and in the ends 25 of the metal cross piece 15', and also in the wooden handle bars 10. Preferably additional bolts 31 are provided for securing the nose 24 to the wooden handle bars 10, these bolts 31 being disposed in apertures in the arms 29, the bolts also extending in registering apertures in the metal strips 16 and 17 and in the wooden handle bars 10, the said bolts also extending in apertures in flanges 32 on the axle support 13 to secure the latter.

It will, therefore, be seen that the hand truck may be made at a reasonable cost and that it will not only have the flexibility of a wooden hand truck, but it will have great strength and durability and that the parts are so arranged relatively to each other that the hand truck may be assembled quickly, which permits the manufacture of the hand truck at a reasonable cost.

In the modified form of the invention shown in Figures 4 and 5, the wooden handle bars 40 have longitudinally extending metal strips 41 disposed at their under sides which correspond with the metal strips 17 shown in Figures 2 and 3 of the drawings. At the top of the handle bars 40, there is a metal plate 42, the metal plate 42 and the metal strips 41 being secured to the wooden handle bars 40 by bolts 43 which extend through apertures in the metal plate 42, the wooden handle bars 40 and in the metal strips 41. The metal plate 42 has openings 44 between the wooden handle bars 40, the edges 45 of the metal plate 42 being turned down at the said openings 44. The forward end of the metal plate 42 is turned or fashioned to form a nose 46 and the metal plate 42 has lateral extensions 47 which form guards disposed over the wheels 27 which are mounted as explained in connection with the form of the invention shown in Figures 1, 2 and 3 of the drawings. The form of the invention shown in Figures 4 and 5 of the drawings is also provided with legs 11 and leg braces 12 such as are shown in Figures 1 and 2 of the drawings, the leg braces 12 having the flanges 22 secured to the underside of the metal plate 42 by bolts 48.

What is claimed is:

A truck having supporting wheels and wooden handle bars, the wooden handle bars having recesses in their horizontal portions, metal cross pieces having ends disposed in the recesses with certain of the ends of the metal cross pieces extending beyond the handle bars to act as guards for the wheels, metal strips disposed against the upper and lower surfaces of the wooden handle bars, the upper metal strips covering the said ends of the metal cross pieces, a nose having arms disposed on the upper surfaces of the metal strips at one of the metal cross bars, the arms, the metal strips, the ends of the metal cross pieces and the wooden handle bars having registering apertures, and securing means disposed in the apertures.

EUGENE E. GOMES.
SAMUEL L. HANCOCK.